(12) United States Patent
Li

(10) Patent No.: US 7,108,372 B2
(45) Date of Patent: Sep. 19, 2006

(54) EYEGLASSES ASSEMBLY WITH ELASTIC TEMPLES

(75) Inventor: Hsing-Chen Li, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 15 days.

(21) Appl. No.: 11/017,951

(22) Filed: Dec. 22, 2004

(65) Prior Publication Data

US 2006/0132706 A1    Jun. 22, 2006

(51) Int. Cl.
*G02C 5/14* (2006.01)
(52) U.S. Cl. .......................................... 351/153; 16/228
(58) Field of Classification Search ................ 351/153, 351/111, 113, 114, 41; 16/228
See application file for complete search history.

(56) References Cited

U.S. PATENT DOCUMENTS 5,009,495 A * 4/1991 Williams ..................... 351/153
6,857,738 B1 * 2/2005 Bove et al. .................. 351/153

* cited by examiner

*Primary Examiner*—Hung Xuan Dang
(74) *Attorney, Agent, or Firm*—Rosenberg, Klein & Lee

(57) ABSTRACT

An eyeglasses assembly includes an eyeglasses frame, two elastic members and a pair of temples. The eyeglasses frame is provided with a vertical through hole, an inserting hole and a pair of opposite screw holes at each hinge. Each elastic member is made of highly elastic material and provided with two opposite barbs and a notch formed between two barbs. Each temple is provided with a protruding portion at the front end, and a screw hole is provided in each protruding portion.

4 Claims, 8 Drawing Sheets

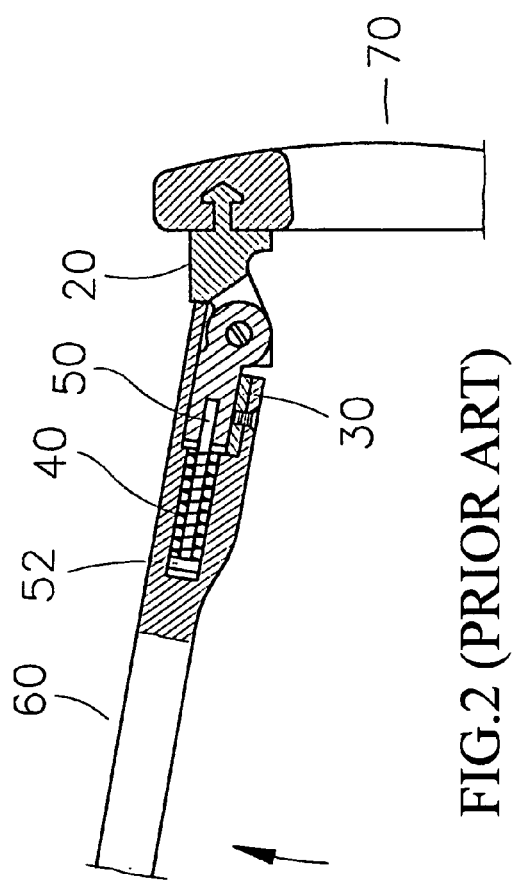
FIG.2 (PRIOR ART)
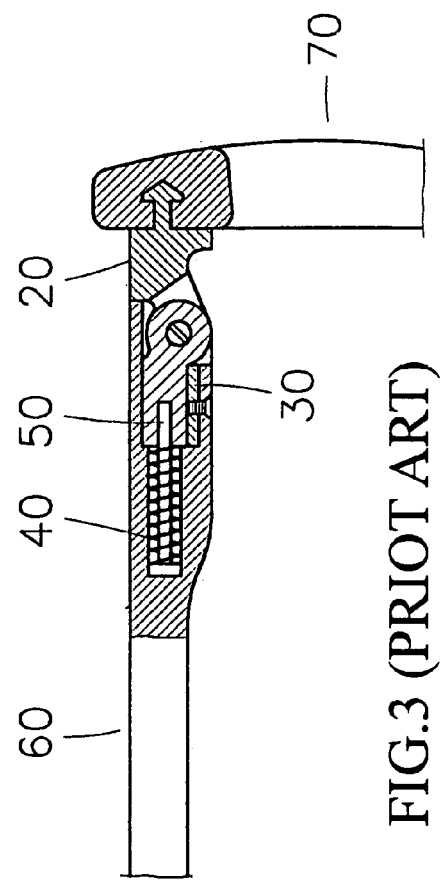
FIG.3 (PRIOT ART)

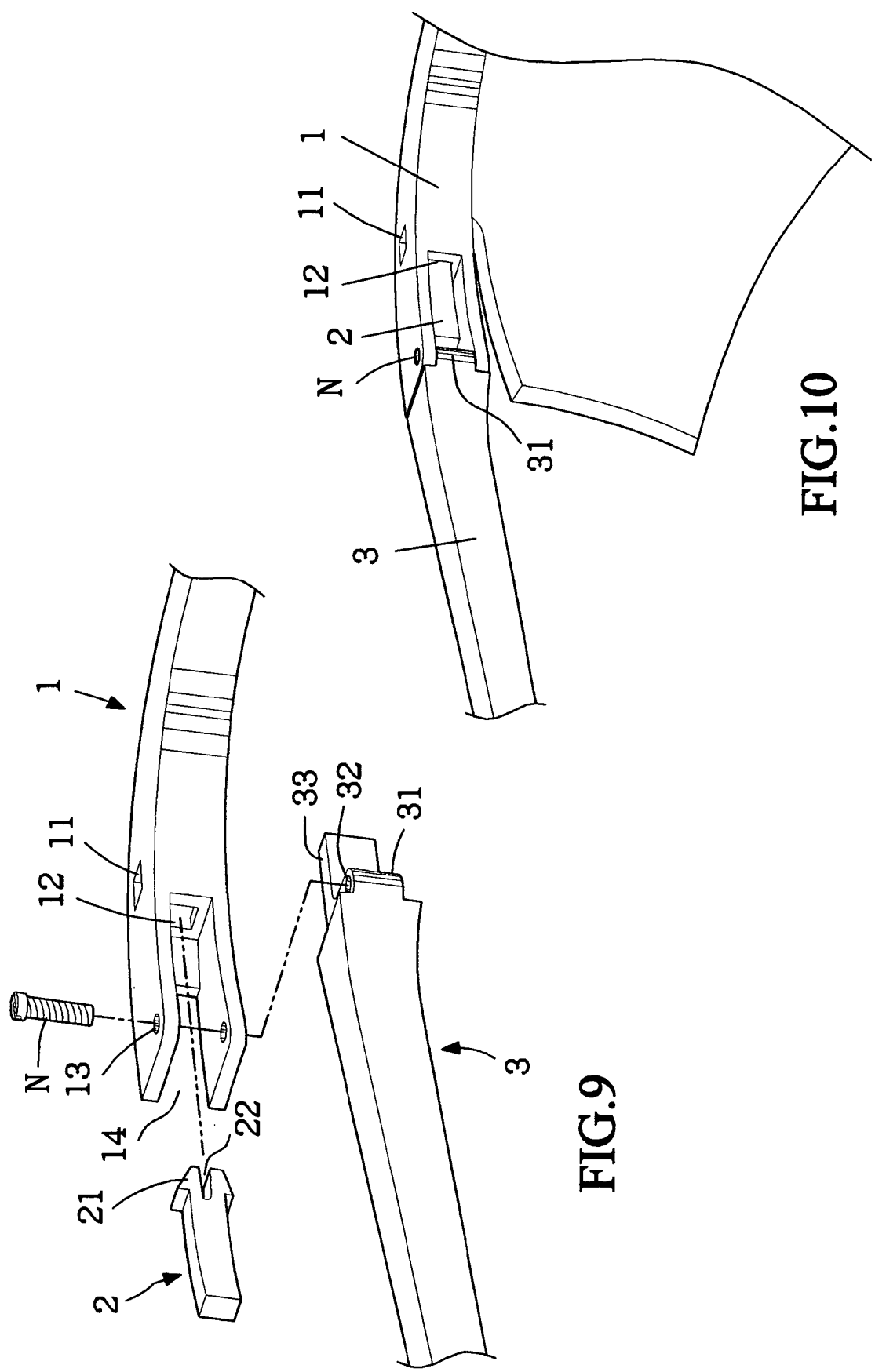

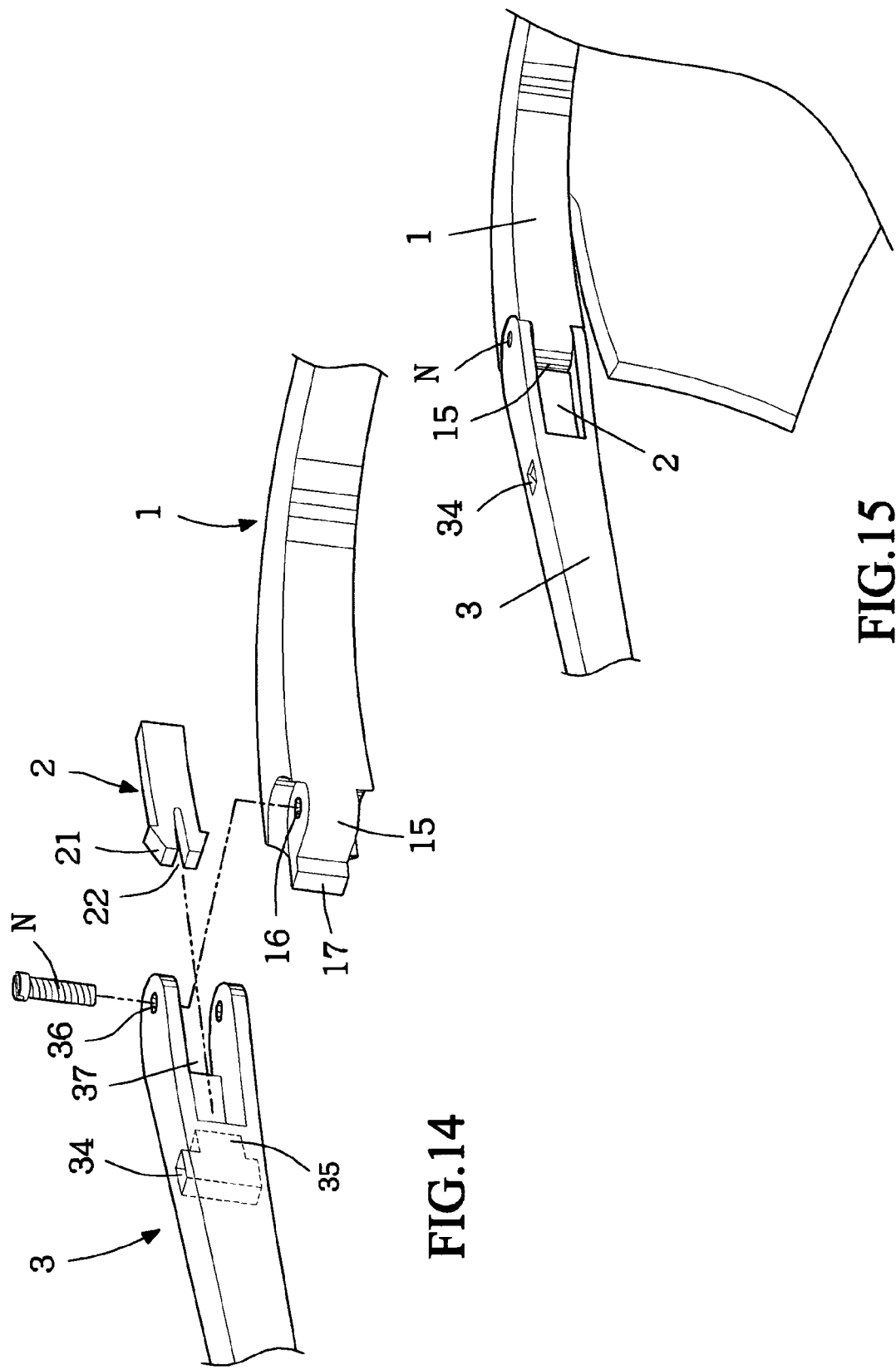

US 7,108,372 B2

EYEGLASSES ASSEMBLY WITH ELASTIC TEMPLES

BACKGROUND OF THE INVENTION

1. Field of the Invention

This invention relates to an eyeglasses assembly with innovatory convenience and comfort features, and more particularly to an eyeglasses assembly which is provided with an elastic device for detachably securing each temple to each hinge of the eyeglasses frame, so as for the temples to be adjusted to accommodate persons having a wide range of different head widths while maintaining a positive position on the wearer's head.

2. Description of the Related Art

Eyeglasses are indispensable for modern people in daily life. Especially, a pair of eyeglasses provided with elastic temples are more popular because the angles of the elastic temples can be adjusted to accommodate persons having a wide range of different head widths to wear comfortably.

Referring to FIG. 1, a conventional elastic eyeglasses temple 60 is provided with an elastic device to be secured to each hinge 20 of a pair of eyeglasses. Each elastic device includes a lateral U-shaped block 30, a spring 40 and a rivet 50. After each hinge 20, each lateral U-shaped block 30, each spring 40 and each rivet 50 are assembled together, the elastic device is inserted into the recess 61 of each eyeglasses temple 60, and then a screw is laterally screwed into the screw hole 31 of each lateral U-shaped block 30 so as to firmly secure all parts in position, as shown in FIG. 2.

Referring to FIG. 3, when each temple 60 being pushed outward to make the angle between each temple 60 and the eyeglasses rim be over 90 degrees, each lateral U-shaped block 30 screwed in each temple 60 will slide on the pivotal member of each hinge 20 and squeeze the spring 40 to shrink toward the rivet head 52 of each rivet 50 so as to prevent each temple 60 from being broken and to prevent each temple 60 from separating from the rim 70 for a period of time of use.

However, there are following drawbacks in the above-mentioned conventional eyeglasses temple:

1. The parts of the elastic device of each conventional eyeglasses temple are so plural that they are troublesome to be assembled.

2. The parts of the elastic device of each conventional eyeglasses temple are so plural that they cost much.

SUMMARY OF THE INVENTION

Therefore, the present invention is to provide an eyeglasses assembly with elastic temples that substantially obviates the drawbacks of the related conventional art.

An objective of the present invention is to provide an eyeglasses assembly which is provided with an elastic device for detachably securing each temple to each hinge of the eyeglasses frame.

Another objective of the present invention is to provide an eyeglasses assembly whose elastic temples can be adjusted to accommodate persons having a wide range of different head widths while maintaining a positive position on the wearer's head.

A further objective of the present invention is to provide an eyeglasses assembly which is assembled by fewer parts that it saves cost and time in assembly.

Accordingly, an eyeglasses assembly in the present invention includes an eyeglasses frame, two elastic members and a pair of temples. The eyeglasses frame is provided with a vertical through hole, an inserting hole and a pair of opposite screw holes at each hinge. Each elastic member is made of highly elastic material and provided with two opposite barbs and a notch formed between two barbs. Each temple is provided with a protruding portion at the front end, and a screw hole is provided in each protruding portion.

BRIEF DESCRIPTION OF THE DRAWINGS

Other features and advantages of the present invention will become apparent in the following detailed description of the preferred embodiments with reference to the accompanying drawings, in which:

FIG. 2 is a top sectional view of the conventional elastic device and an eyeglasses temple in an assembled configuration;

FIG. 3 is a schematic top sectional view of the conventional elastic device and an eyeglasses temple in an assembled configuration when being pushed outward;

FIG. 9 is a perspective exploded view of another embodiment of the elastic device for a temple being secured to each hinge of an eyeglasses frame in accordance with the present invention;

FIG. 10 is a perspective view of another embodiment of the elastic device and a temple in an assembled configuration in accordance with the present invention;

FIG. 14 is a perspective exploded view of a further embodiment of the elastic device for a temple being secured to each hinge of an eyeglasses frame in accordance with the present invention;

FIG. 15 is a perspective view of a further embodiment of the elastic device and a temple in an assembled configuration in accordance with the present invention;

DETAILED DESCRIPTION OF THE PREFERRED EMBODIMENTS

Figure 1:
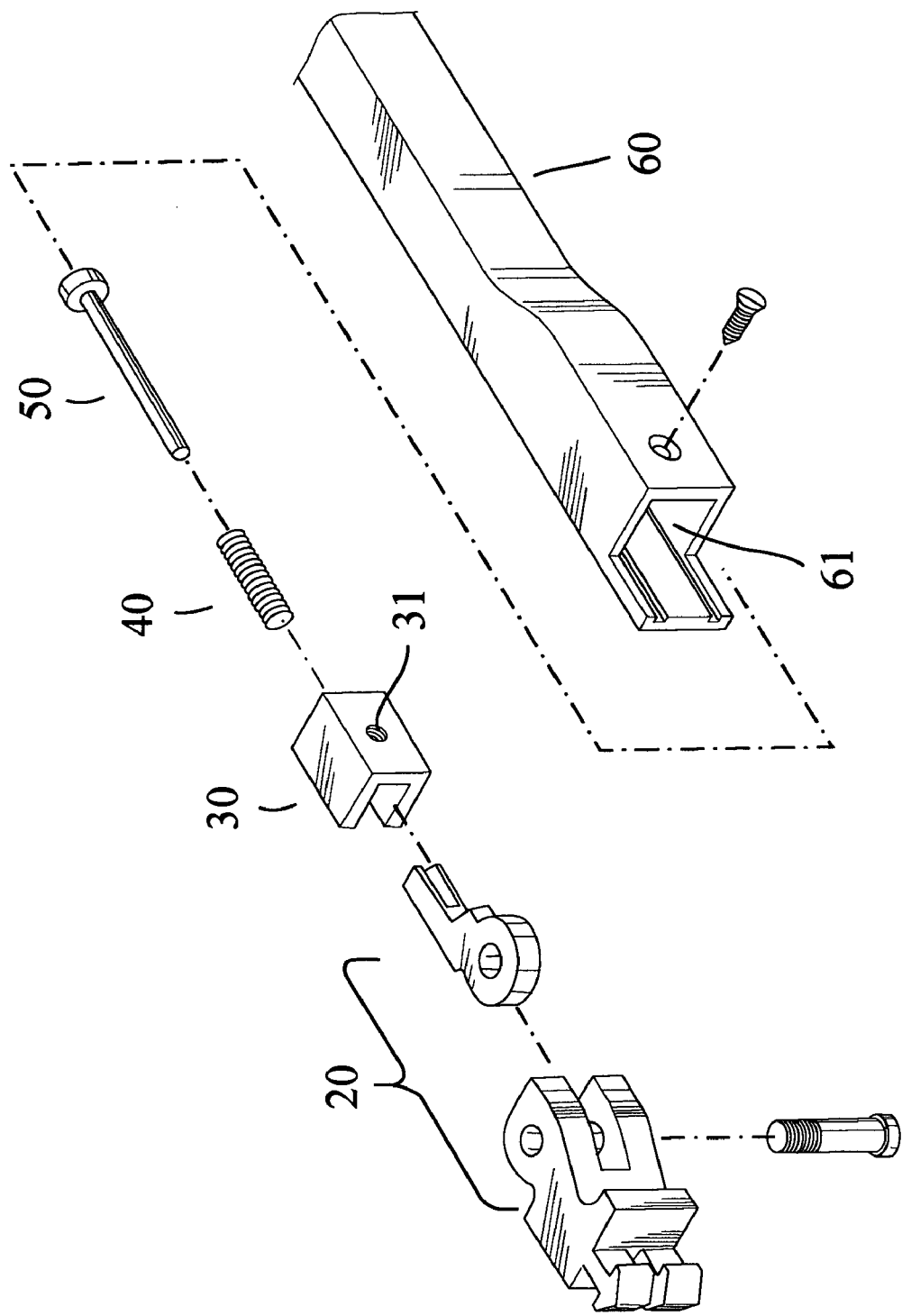
FIG. 1 is a perspective exploded view of a conventional elastic device and an eyeglasses temple.
Figure 5:
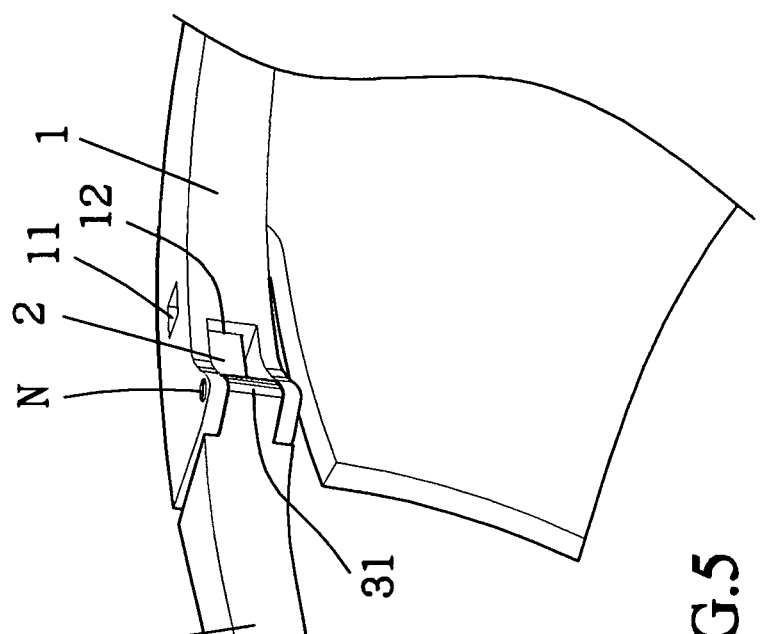
FIG. 5 is a perspective view of an embodiment of the elastic device and a temple in an assembled configuration in accordance with the present invention.
Figure 4:
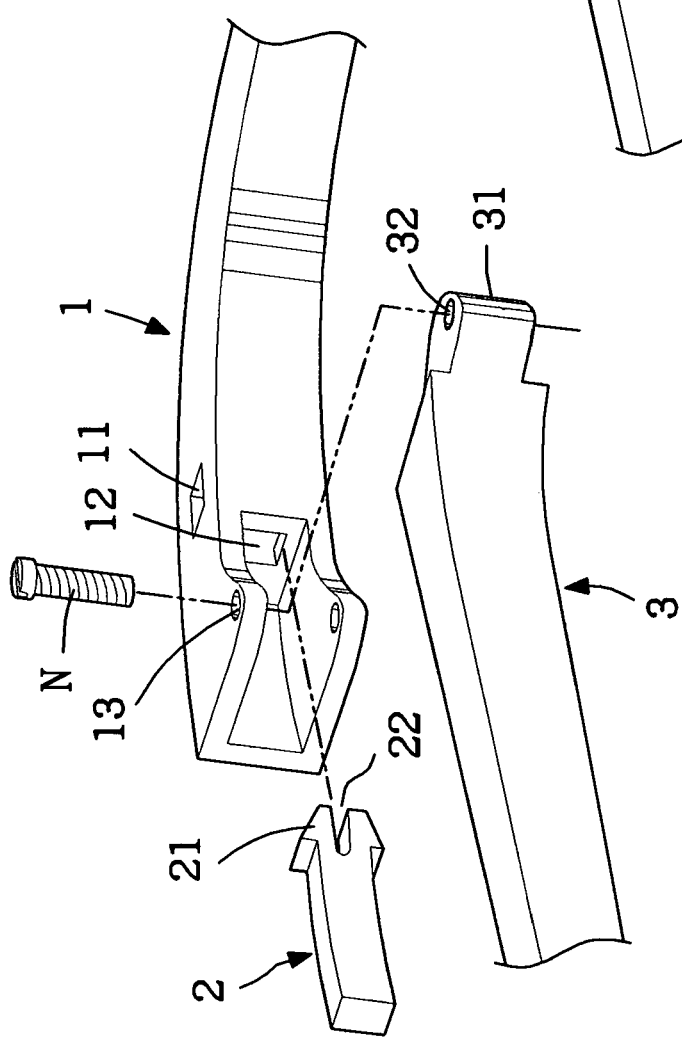
FIG. 4 is a perspective exploded view of an embodiment of the elastic device for a temple being secured to each hinge of an eyeglasses frame in accordance with the present invention.
Figure 6:
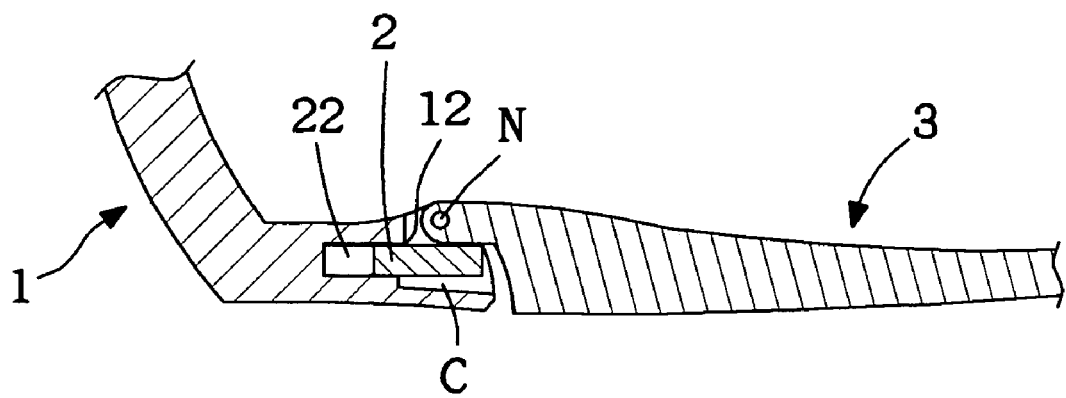
FIG. 6 is a top sectional view of an embodiment of the elastic device and a temple in an assembled configuration in accordance with the present invention.
Figure 7:
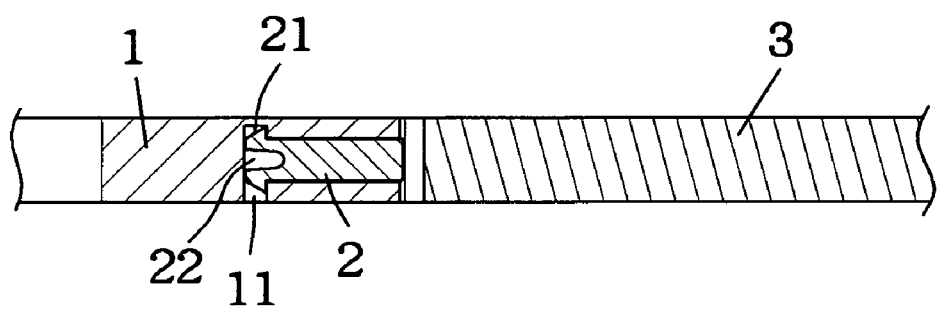
FIG. 7 is a side sectional view of an embodiment of the elastic device and a temple in an assembled configuration in accordance with the present invention.

Referring to FIG. 4, an embodiment of the eyeglasses assembly in the present invention includes an eyeglasses frame 1, two elastic members 2 and a pair of temples 3.

The eyeglasses frame 1 is provided with a vertical through hole 11, an inserting hole 12 and a pair of opposite screw holes 13 at each hinge. Each elastic member 2 is made of highly elastic material and provided with two opposite barbs 21 and a notch 22 formed between two barbs 21. Each temple 3 is provided with a protruding portion 31 at the front end, and a screw hole 32 is provided in each protruding portion 31.

While an embodiment of the eyeglasses assembly being assembled, referring to FIGS. 4,5,6 and 7, one end of each elastic member 2 is inserted into each inserting hole 12 of the eyeglasses frame 1, so as for the opposite barbs 21 to be caught in each vertical through hole 11, and a space C is formed between one side of each elastic member 2 and the inner side of each hinge of the eyeglasses frame 1. At last, the front end of each temple 3 is inserted in each hinge of the eyeglasses frame 1 for each screw hole 32 to be registered with each pair of screw holes 13, and a screw N is screwed to firmly secure each temple 3 to each hinge of the eyeglasses frame 1.

Figure 8:
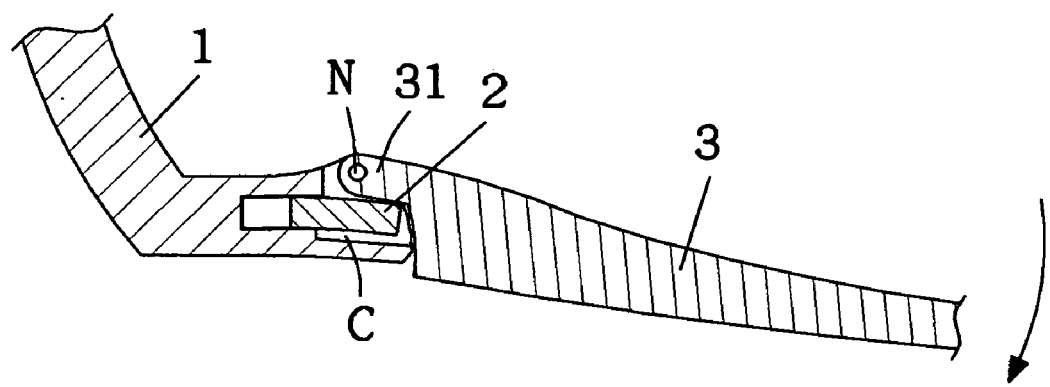
FIG. 8 is a schematic top sectional view of an embodiment of the elastic device and a temple in an assembled configuration in accordance with the present invention when being pushed outward.
Figure 11:
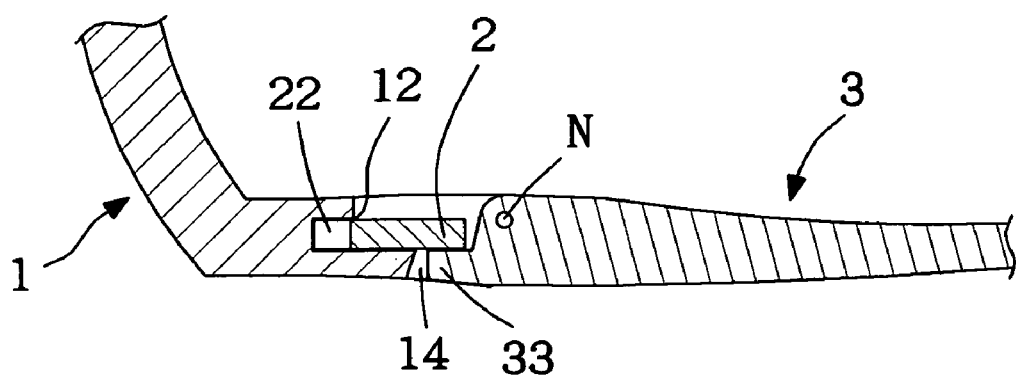
FIG. 11 is a top sectional view of another embodiment of the elastic device and a temple in an assembled configuration in accordance with the present invention.
Figure 12:
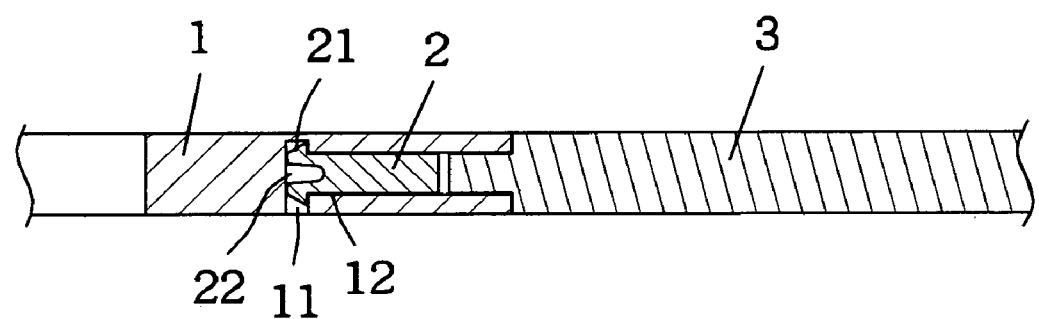
FIG. 12 is a side sectional view of another embodiment of the elastic device and a temple in an assembled configuration in accordance with the present invention.

While each temple 3 of an embodiment of the eyeglasses assembly being pushed outward, referring to FIG. 8, one end of each elastic member 2 will be squeezed by one side of each protruding portion 31 and bend toward the space C, so as to effectively adjust the width of each temple 3.

Referring to FIG. 9, another embodiment of the eyeglasses assembly in the present invention includes an eyeglasses frame 1, two elastic members 2 and a pair of temples 3.

The eyeglasses frame 1 is provided with a vertical through hole 11, an inserting hole 12, a pair of opposite screw holes 13 and a lateral opening 14 at each hinge. Each elastic member 2 is made of highly elastic material and provided with two opposite barbs 21 and a notch 22 formed between two barbs 21. Each temple 3 is provided with a protruding portion 31 and a stopping block 33 at the front end, and a screw hole 32 is provided in each protruding portion 31.

While another embodiment of the eyeglasses assembly being assembled, referring to FIGS. 9,10,11 and 12, one end of each elastic member 2 is inserted into each inserting hole 12 of the eyeglasses frame 1, so as for the opposite barbs 21 to be caught in each vertical through hole 11. The stopping block 33 of each temple 3 is inserted in each lateral opening 14 at each hinge for each screw hole 32 to be registered with each pair of screw holes 13, and a screw N is screwed to firmly secure each temple 3 to each hinge of the eyeglasses frame 1.

Figure 13:
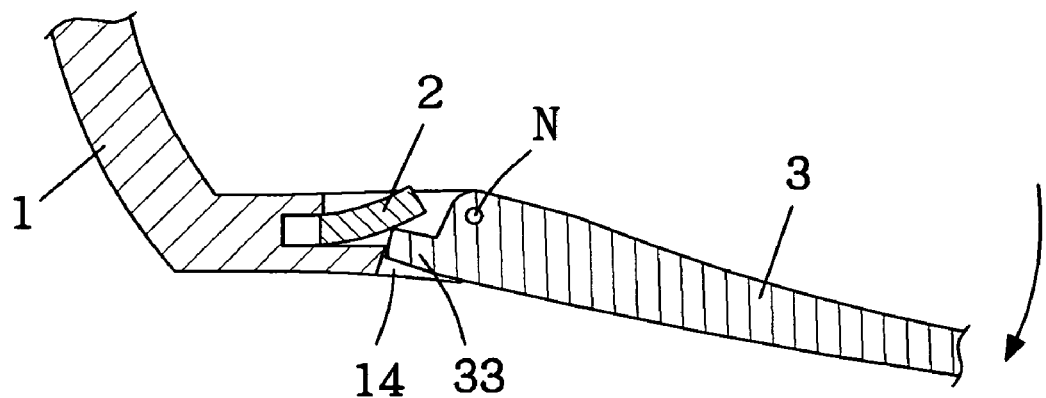
FIG. 13 is a schematic top sectional view of another embodiment of the elastic device and a temple in an assembled configuration in accordance with the present invention when being pushed outward.
Figure 16:
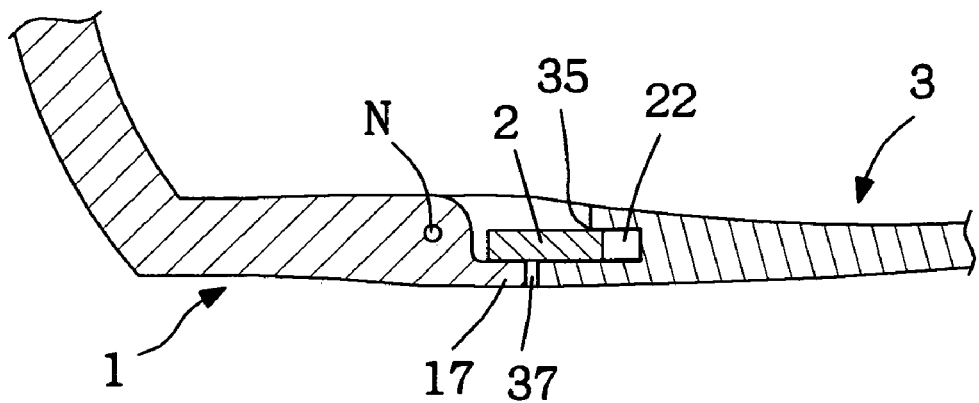
FIG. 16 is a top sectional view of a further embodiment of the elastic device and a temple in an assembled configuration in accordance with the present invention.
Figure 17:
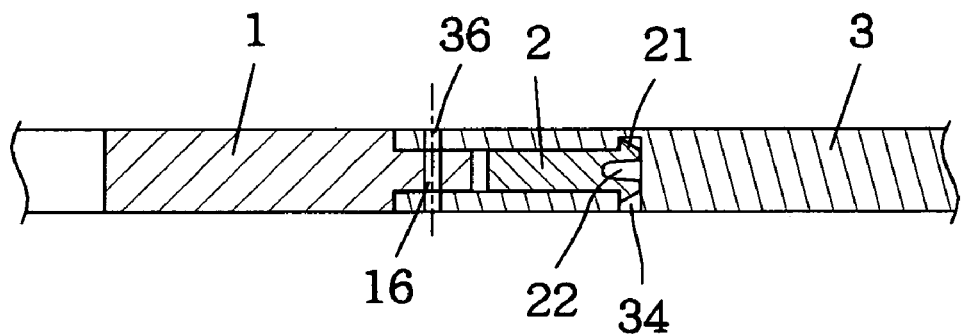
FIG. 17 is a side sectional view of a further embodiment of the elastic device and a temple in an assembled configuration in accordance with the present invention; and, FIG. 18 is a schematic top sectional view of a further embodiment of the elastic device and a temple in an assembled configuration in accordance with the present invention when being pushed outward.

While each temple 3 of another embodiment of the eyeglasses assembly being pushed outward, referring to FIG. 13, one end of each elastic member 2 will be stopped by each stopping block 33 and bend inward, so as to effectively adjust the width of each temple 3.

Referring to FIG. 14, a further embodiment of the eyeglasses assembly in the present invention includes an eyeglasses frame 1, two elastic members 2 and a pair of temples 3.

The eyeglasses frame 1 is provided with a protruding portion 15 and a stopping block 17 at each hinge, and a screw hole 16 is provided in each protruding portion 15. Each elastic member 2 is made of highly elastic material and provided with two opposite barbs 21 and a notch 22 formed between two barbs 21. Each temple 3 is provided with a vertical through hole 34, an inserting hole 35, a pair of opposite screw holes 36 and a lateral opening 37 at the front end.

While a further embodiment of the eyeglasses assembly being assembled, referring to FIGS. 14,15,16 and 17, one end of each elastic member 2 is inserted into each inserting hole 35 of each temple 3, so as for the opposite barbs 21 to be caught in each vertical through hole 34. The stopping block 17 at each hinge of the eyeglasses frame 1 is inserted in each lateral opening 37 of each temple 3 for each screw hole 16 to be registered with each pair of screw holes 36, and a screw N is screwed to firmly secure each temple 3 to each hinge of the eyeglasses frame 1.

Figure 18:
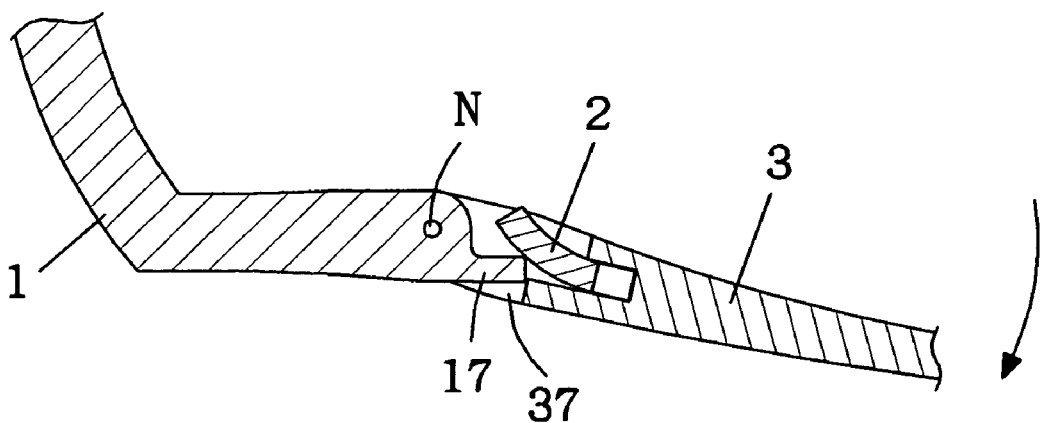

While each temple 3 of a further embodiment of the eyeglasses assembly being pushed outward, referring to FIG. 18, one end of each elastic member 2 will be stopped by each stopping block 17 and bend inward, so as to effectively adjust the width of each temple 3.

While the preferred embodiments of the invention have been described above, it will be recognized and understood that various modifications may be made therein and the appended claims are intended to cover all such modifications which may fall within the spirit and scope of the invention.

What is claimed is:

1. An eyeglasses assembly comprising:
   an elastic member being provided between one hinge of an eyeglasses frame and a temple, said temple being provided with a vertical through hole, an inserting hole, screw holes and a lateral opening at a front end thereof.

2. An eyeglasses assembly as recited in claim 1, wherein said elastic member is provided with barbs.

3. An eyeglasses assembly as recited in claim 1, wherein said elastic member is made of highly elastic material.

4. An eyeglasses assembly as recited in claim 1, wherein said eyeglasses frame is provided with a protruding portion and a stopping block at each binge, and a screw hole is provided in each said protruding portion.

* * * * *